Sept. 5, 1967    D. A. WILSON    3,339,602
COLLAPSIBLE SAW
Filed Sept. 21, 1965
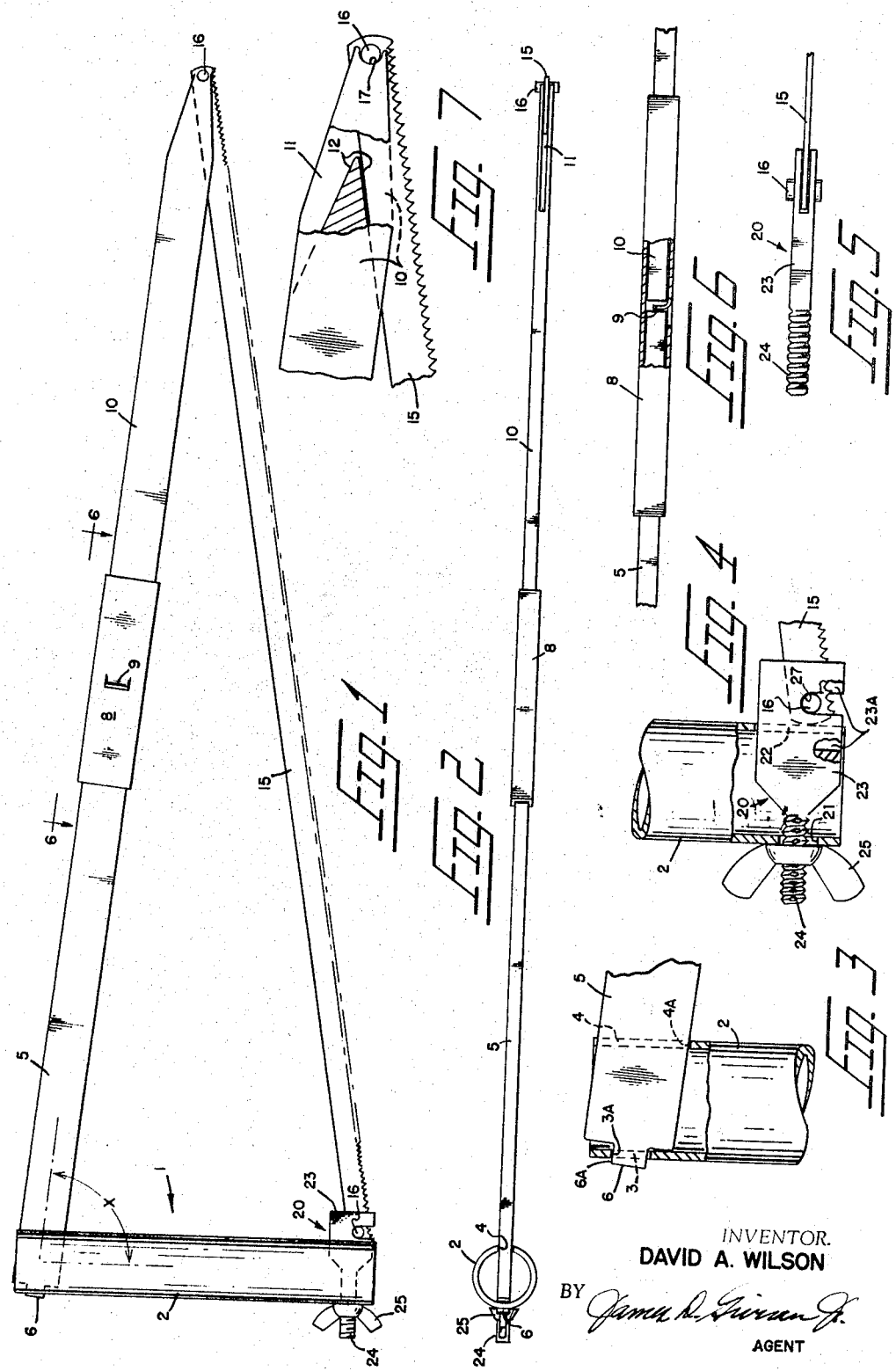
INVENTOR.
DAVID A. WILSON
BY
AGENT

United States Patent Office 3,339,602
Patented Sept. 5, 1967

3,339,602
COLLAPSIBLE SAW
David A. Wilson, Box 652, St. Helens, Oreg. 97051
Filed Sept. 21, 1965, Ser. No. 488,945
2 Claims. (Cl. 145—33)

ABSTRACT OF THE DISCLOSURE

A collapsible hand saw having a handle of tubular stock which suports at one of its ends a saw frame member and at its opposite end mounts saw blade tensioning means. Both ends of said handle are identically formed to interchangeably receive either the end of said frame member or the blade tensioning means. A saw blade is connected at one of its ends to said tensioning means and is supported at its opposite end by said saw frame members where upon tensioning of the blade the saw components are secured in a rigid, operative manner.

---

This invention relates to collapsible saws and particularly to a saw of knockdown construction suitable for convenient carrying on the person and of the type shown and described in my U.S. Patent No. 2,781,806, issued Feb. 19, 1957.

An important object of this invention is to provide a saw manufactured from low cost, commercially available tube and bar stock materials to provide a saw of unitary, rigid construction having the desirable features of being very lightweight, compact and hence very portable. The significant low cost of manufacture is achieved partly through the novel saw design which allows the forming of all bar stock components from one piece and in one cutting operation.

Another important object of the present invention is the provision of a saw in which the handle component is of lightweight, tubular form, machined in an identical manner at both of its ends to facilitate rapid and foolproof assembly. In addition, a frame member of the saw is specifically formed to provide for such assembly. While the saw presently disclosed is not limited to being used by outdoorsmen, a considerable number are used in the field in the dressing and quartering of large game animals. Relevant to such uses are the saw's portability and rapid assembly characteristics both of which are highly desirable in view of the adverse conditions under which such assembly may take place. These features which facilitate assembly of the saw in the field provide a distinct advance over other collapsible saws.

A further object of this invention resides in the tubular handle which provides a storage receptacle for the doubled back flexible blade portion of the saw when disassembled thus permitting the saw components to be "packaged" within a container of minimum size.

A still further object resides in a rectangular sleeve member which is provided with a limit stop to assure proper positioning relative to the opposing ends of frame members inserted therein. The rigidity of the present saw is in part due to a substantial buckling load applied to the sleeve member through the elongated frame members.

Important to the sleeve members ability to withstand the load so applied is its equidistant positioning on the frame members as determined by the limit stop means therein provided.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of the present invention.

FIGURE 2 is a plan view of the saw of FIGURE 1.

FIGURE 3 is an enlarged, fragmentary view of the upper end of the saw handle and frame member associated therewith.

FIGURE 4 is a view similar to FIGURE 3 of the lower end of the saw handle and tensioning means associated therewith.

FIGURE 5 is a plan view of saw blade tensioning means disassociated from the lower end of the handle and with the wing nut removed.

FIGURE 6 is an enlarged, fragmentary view taken along line 6—6 of FIGURE 1 and showing, in plan view, the sleeve member and limit stop means formed therein.

FIGURE 7 is an enlarged fragmentary view of the end of the forward frame member which supports the outer end of the saw blade.

With continuing reference to the drawing and particularly FIGURE 1 thereof, the reference numeral 1 indicates generally the saw of the present invention of collapsible or knockdown construction, having a hollow handle 2 cylindrical in form and preferably machined from commercially available tube stock of an aluminum alloy metal.

The handle 2 is provided with a rectangularly shaped opening 3 adjacent its upper end and a diametrically opposed open ended slot 4, as best shown in FIGURE 3, for supporting engagement with one end of a first frame member 5. Identically disposed at the lower end of the handle 2 is an opening and slot of like dimensions to provide a handle having interchangeable ends to facilitate the assembly of the saw as more fully hereinafter elaborated.

The rectangular opening 3 receives an extension 6 projecting rearwardly from and integral with the rearward edge of frame member 5. When the saw is assembled in operational configuration it will be seen that the upper surface 6A of the extension bears upwardly against the upper perimeter 3A of the opening 3. Frame member 5 is supported within the open ended slot 4 of the handle by the end wall 4A of the slot and extends forwardly terminating within an open ended sleeve member 8 which is preferably formed from stainless steel of approximately 1/32 inch thickness and of sufficient length to satisfactorily support frame member 5 and a forward frame member 10 against buckling force carried thereby.

The forward end of fame member 5 and the rearward end of the second or forward frame member 10 extend an equal distance into the closely fitting sleeve member 8 and abut opposite sides of a limit stop in the form of a clip 9 punched inwardly from one wall of the sleeve, as best illustrated in FIGURE 6. The clip 9 assures equidistant positioning of the frame members within the sleeve 8 to symmetrically distribute the buckling load applied by tensioning means, as later described, imparted to the sleeve. The sleeve 8 may be formed with overlapping portions (not shown) and thereat spot welded.

As shown in FIGURE 7, the forward end of the second frame member 10 is bifurcated by a vertically disposed slot 11 extending therethrough to accommodate an ordinary flexible saw blade 15. The slot 11 terminates interiorly of the frame member in a pair of converging walls 12. It will be readily understood that the above described slot 11 so formed permits the frame member 10 to function as such in two positions rotated through 180 degrees about its longitudinal axis. This last mentioned feature, along with the symmetrically formed handle, are particularly desirable features in view of the often inclement environmental conditions existing in the field when the saw is assembled.

Mounting pins 16 extend crosswise of the blade 15 adjacent each end thereof with the forward mounting pin retained within a semi-circular recess 17 formed in the bifurcated end of frame member 10.

While shown and described as including first and second frame members 5 and 10 respectively for facilitating convenient "packaging" of the saw, it is obvious that uses other than by outdoorsmen may best be met by a unitary frame member dispensing, of course, with the sleeve member 8.

Carried within the lower end of the handle 2 in a transverse manner are blade tensioning means indicated generally at 20, as best shown in FIGURES 4 and 5. The handle 2, as aforementioned, is provided at its lower end with a rectangular opening indicated at 21 and a diametrically opposed open ended slot 22 respectively identical in size and location to opening 3 and slot 4 formed within the upper end of handle 2.

With continuing reference to tensioning means 20, a plate 23 is provided having a threaded shaft extension 24 integral therewith at its rearward end. Plate 23 is adapted for sliding movement perpendicular to the axis of handle 2 within the slot 21 by means of a wing nut 25 bearing against the exterior surface of the handle and operable to move the plate, as viewed in FIGURE 4, to the left tensioning saw blade 15. The end portion of saw blade 15 is received by plate 23 within a vertical slot 23A therein of adequate longitudinal length to permit the rearward mounting pin 16 to be positioned and retained within a pair of transversely aligned grooves 27 in the slotted portion of plate 23. From the above, it is obvious that advancement of wingnut 25 on the threaded extension 24 will result in a tension load on the blade 15 to the extent that it becomes a rigid sawing element and conversely "backing off" of the wingnut is necessary for removal of pin 16 from grooves 27.

Simultaneously with the tensioning of saw blade 15, the frame members 5–10 are urged rearwardly and swung downwardly about end wall 4A to seat the extension 6 within the rectangular opening 3 and more specifically the downward force acting on the frame member 5 to rotate into firm engagement extension 6 thereof against the upper perimeter 3A of opening 3.

Disassembly of the saw is achieved by backing off the wingnut to the extent that the absence of a tension load on the saw blade permits the rearward mounting pin 16 to fall out of the grooves 27. The forward end of the saw blade is then disengaged from frame member 10 permitting the latter along with sleeve member 8 and frame member 5 to be separated for convenient stowing in knockdown form, preferably within a small, cloth sack. The tensioning means 20, at all times, remains attached to the handle 2 to reduce the chances of loss during assembly or disassembly. As best shown in FIGURE 4, the threaded extension 24 is formed as a continuation of plate 23 which in turn may be of bar stock identical to that forming the frame members. This feature permits a substantial part of the saw to be formed in one cutting or stamping operation.

Indicated at x in FIGURE 1 is an angle of approximately 85 degrees defined by the intersecting longitudinal axes of handle 2 and the frame member 5 and while not critical is mentioned for the purpose of acknowledging the fact that the tensioning of the saw blade will necessarily cause some downward displacement of the frame members from their position at rest as supported within the handle 2.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A collapsible saw of knockdown type construction comprising in combination;
   a saw blade,
   an upright hollow cylindrical handle defining adjacent both its top and bottom ends a rectangular opening and an open ended slot in opposed relationship,
   elongated frame means supported at one of its ends at the top end of said handle, said frame means terminating at said one end in a longitudinal projection for occupying engagement within the opening adjacent the top end of said handle and at its opposite end terminating in supporting engagement with said saw blade, and
   blade tensioning means carried at the bottom end of said handle and comprising a plate slidably disposed within the open-ended slot defined by said bottom end, said plate including a threaded extension extending outwardly of said handle through the rectangular opening in said bottom end of the handle and receiving a nut element for tensioning of the blade resulting in said projection being brought into locked engagement with the perimeter of the occupied opening.

2. A collapsible saw as claimed in claim 1 wherein said elongated frame means includes longitudinally aligned forward and rearward frame members and a sleeve member of rectangular section coupling said frame members, said sleeve member including an inwardly turned clip portion at the center of said sleeve to limit the inward travel of said frame members during assembly of the saw.

References Cited

UNITED STATES PATENTS 2,781,806   2/1957   Wilson.
3,149,652   9/1964   Swenson _____ 145—34

FOREIGN PATENTS 699,696   12/1964   Canada.

WILLIAM FELDMAN, *Primary Examiner.*

R. V. PARKER, Jr., *Assistant Examiner.*